(12) United States Patent
Erickson (10) Patent No.: US 8,777,158 B2
(45) Date of Patent: Jul. 15, 2014

(54) JOINT SEALING SYSTEM

(75) Inventor: Marcus Alexander Clarence Erickson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 13/071,611

(22) Filed: Mar. 25, 2011

(65) Prior Publication Data
US 2012/0241560 A1    Sep. 27, 2012

(51) Int. Cl.
*B64C 1/26*    (2006.01)

(52) U.S. Cl.
USPC ....................................... 244/119; 244/135 R (58) Field of Classification Search
USPC ....... 244/119, 135 R; 277/634, 635; 285/226, 285/227, 229
See application file for complete search history.

(56) References Cited

U.S. PATENT DOCUMENTS

| | | | | |
|---|---|---|---|---|
| 2,806,665 A | * | 9/1957 | Gibson | 244/135 R |
| 2,936,185 A | * | 5/1960 | Olsen et al. | 285/226 |
| 3,039,721 A | * | 6/1962 | Rogers, Jr. | 244/135 R |
| 4,286,761 A | * | 9/1981 | Musgrove | 244/99.2 |
| 4,645,244 A | * | 2/1987 | Curtis | 285/114 |
| 6,315,332 B1 | | 11/2001 | Aschoff et al. | |
| 8,167,245 B1 | * | 5/2012 | Koehler et al. | 244/123.1 |

* cited by examiner

*Primary Examiner* — Tien Dinh
*Assistant Examiner* — Michael Kreiner
(74) *Attorney, Agent, or Firm* — Yee & Associates, P.C.

(57) ABSTRACT

A method and apparatus comprises a first section, a second section, and a middle section. The first section is configured to be connected to a first structure. The second section is configured to be connected to a second structure. The first structure and the second structure are connected to each other at a joint. The middle section is located between the first section and the second section. The middle section has a length that is configured to change in response to a movement between the first structure and the second structure. The first section, the middle section, and the second section form a cover that is configured to form a seal for the joint.

10 Claims, 9 Drawing Sheets

JOINT SEALING SYSTEM

BACKGROUND INFORMATION

1. Field

The present disclosure relates generally to aircraft and, in particular, to joints in aircraft.

2. Background

An aircraft has many different components. For example, the airframe of an aircraft has many different sections. The different sections may include, for example, a fuselage, wings, stabilizers, and other types of structures. These and other structures are formed from different components that may be joined together. The location at which two or more components are joined form a joint.

Stringers are examples of stiffening elements that may run through the wing and fuselage of an aircraft. For example, stringers are longitudinal reinforcements that may be located in, for example, a fuselage or wing of an aircraft. Multiple stringers may be connected to each other to form a continuous channel. Also, these stringers may be attached to a connector, such as a rib or other structural component that connects two or more stringers to each other. These channels may provide a cavity for fluid flow or for holding wiring bundles.

When stringers are used for fluid flow, it is desirable to reduce or eliminate leakage in the stringers. For example, the materials used in the design of the stringers are selected to allow for the flow of fluid without the fluid leaking through the walls of the stringers. It is also desirable to reduce and/or eliminate leakage at the joints where stringers are connected to each other or to other structures.

Therefore, it would be advantageous to have a method and apparatus that takes into account at least some of the issues discussed above, as well as other possible issues.

SUMMARY

In one advantageous embodiment, an apparatus comprises a first section, a second section, and a middle section. The first section is configured to be connected to a first structure. The second section is configured to be connected to a second structure. The first structure and the second structure are connected to each other at a joint. The middle section is located between the first section and the second section. The middle section has a length that is configured to change in response to a movement between the first structure and the second structure. The first section, the middle section, and the second section form a cover that is configured to form a seal for the joint.

In another advantageous embodiment, an aircraft joint assembly comprises a first structure in an aircraft, a second structure in the aircraft, and a cover. The first structure has a channel configured to carry a fluid. The first structure and the second structure are connected to each other at a joint. The cover has a first section, a second section, and a middle section that are configured to form a seal for the joint.

The middle section is located between the first section and the second section. The first section is connected to the first structure. The second section is connected to the second structure. The middle section is configured to have a length that is configured to change in response to a movement between the first structure and the second structure.

In yet another advantageous embodiment, a method for assembling a joint assembly is provided. A first end of a first structure is positioned relative to a second end of a second structure. A joint is formed between the first structure and the second structure. A cover is positioned over the joint. The cover has a first section, a second section, and a middle section located between the first section and the second section.

The first section of the cover is connected to the first structure and the second section of the cover is connected to the second structure. The middle section of the cover has a length that is configured to change in response to a movement between the first structure and the second structure.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
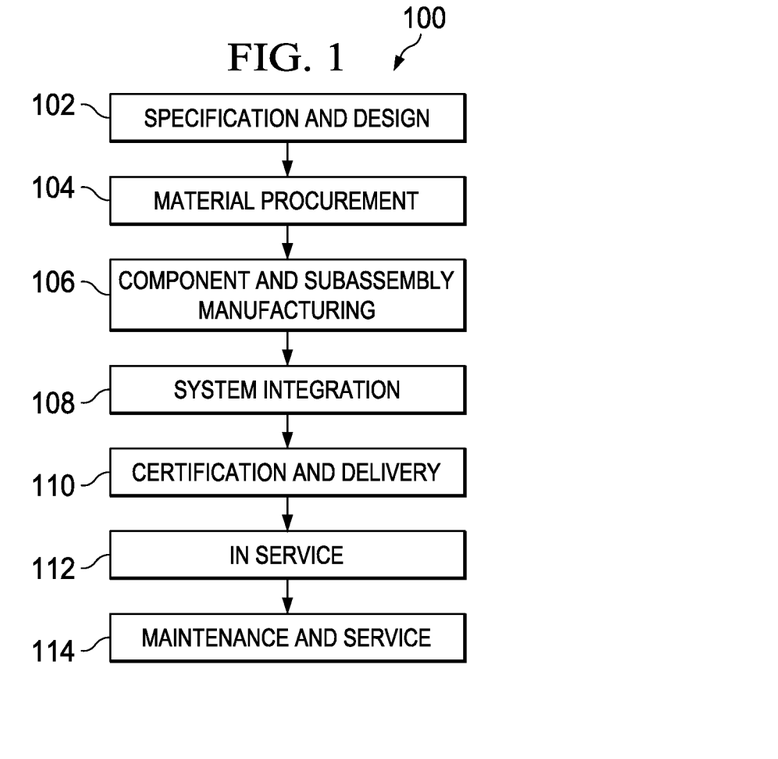
FIG. 1 is an illustration of an aircraft manufacturing and service method in accordance with an advantageous embodiment.
Figure 2:
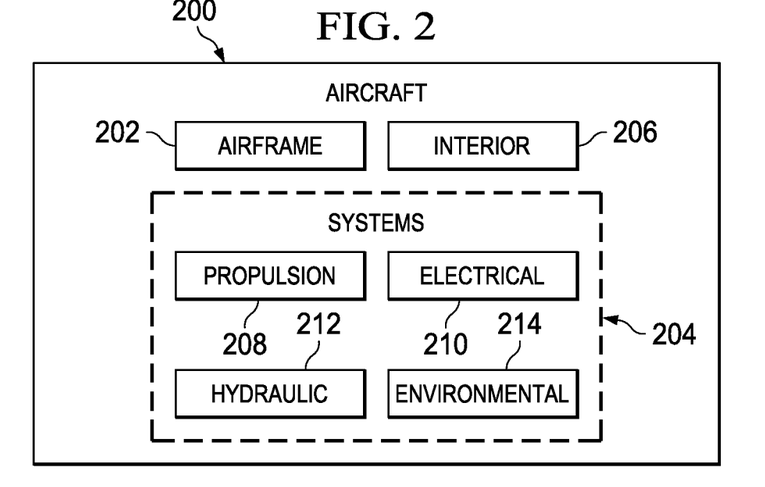
FIG. 2 is an illustration of an aircraft in which an advantageous embodiment may be implemented.

Referring more particularly to the drawings, advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. In particular, joint assemblies for aircraft 200 may be implemented in different stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1.

The use of a number of the different advantageous embodiments may substantially expedite the assembly of and/or reduce the cost of aircraft 200. For example, a joint assembly, according to one or more advantageous embodiments, may be used in manufacturing airframe 202 using component and subassembly manufacturing 106 in FIG. 1. In other advantageous embodiments, the joint assembly may be used during maintenance and service 114.

The different advantageous embodiments recognize and take into account a number of different considerations. The different advantageous embodiments recognize and take into account that with the use of different types of materials currently available designs and sealing systems for joints may not provide a desired amount of sealing for the joint. In other words, the currently available designs and sealing systems for joints may not reduce leaking of fluids and/or prevent fluids from leaking from the joints as much as desired. For example, the different advantageous embodiments recognize and take into account that composite materials may be in stringers as opposed to metals, such as aluminum. The different advantageous embodiments recognize and take into account that with composite stringers, providing a desired amount of sealing at joints using composite stringers may be more difficult than using aluminum stringers.

As another example, the different advantageous embodiments recognize and take into account that with a hat-shaped stringer made of a composite material, the locations at which these types of composite stringers may be attached to structures may be limited based on the use of composite materials. More specifically, fasteners may be used to attach a hat-shaped composite stringer to a structure, and the flanges of the stringer may be used to attach the hat-shaped composite stringer to the structure using the fasteners. Other portions of the hat-shaped composite stringer may not be used in order to maintain a desired level of sealing to allow for fluid flow in the channel in the composite stringer.

For example, the sides and top surface opposite the skin panel of the hat-shaped stringer may not be a suitable location for fasteners when the channel in the hat-shaped stringer is to be used to carry a fluid because the fasteners may obstruct the flow of the fluid. Additionally, fastener installation on the top or sides of the hat shaped stringer may increase the installation time and/or the cost to assemble the joint.

The different advantageous embodiments also recognize and take into account that the locations at which fasteners are used may allow for increased motion at parts of the joint where the stringer and the structure to which the stringer is joined are located. The different advantageous embodiments recognize and take into account that increased movement may occur along an axis extending centrally through the stringer at the location of the joint.

Thus, the different advantageous embodiments provide a cover for use in a joint assembly. The cover has a first section, a second section, and a middle section. The middle section is located between the first section and the second section. The first section is configured to be attached to a first structure, and the second section is configured to be attached to a second structure. The first structure and the second structure are connected at a joint.

The middle section is located between the first section and the second section. The middle section has a length that is configured to change in response to a movement between the first structure and the second structure. The first section, the middle section, and the second section form a cover that is configured to form a seal for the joint. In one or more of the different illustrative examples, the first section, the middle section, and the second section are formed as a single piece from the same material.

Figure 3:
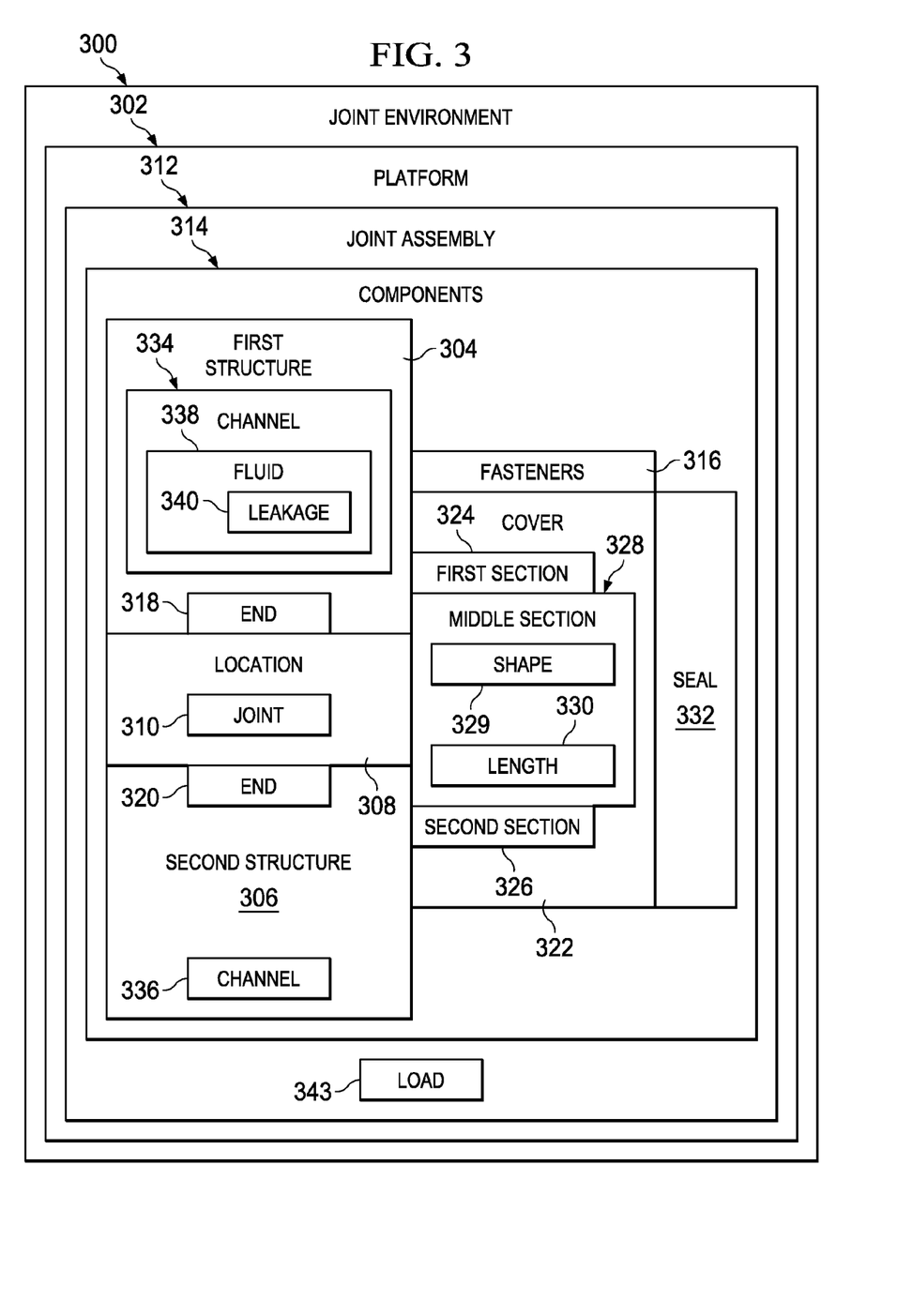
FIG. 3 is an illustration of a joint environment in accordance with an advantageous embodiment.

With reference now to FIG. 3, an illustration of a joint environment is depicted in accordance with an advantageous embodiment. In this illustrative example, joint environment 300 includes platform 302. Platform 302 may take the form of, for example, aircraft 200 in FIG. 2.

In these illustrative examples, platform 302 in joint environment 300 has first structure 304 and second structure 306.

First structure 304 is connected to second structure 306 at location 308. Location 308, where first structure 304 and second structure 306 are connected to each other, forms joint 310. A first component, such as first structure 304, may be considered to be associated with a second component, such as second structure 306, by being secured to the second component, bonded to the second component, fastened to the second component, and/or connected to the second component in some other suitable manner. The first component also may be connected to the second component using a number of other components. The first component also may be considered to be associated with the second component by being formed as part of and/or an extension of the second component.

As depicted, first structure 304 and second structure 306 may be comprised of different types of materials. These materials may include, for example, at least one of a metal, a plastic, a composite material, steel, aluminum, titanium, reinforced plastic, carbon fiber composites, and other suitable types of materials.

Joint assembly 312 comprises components used to form joint 310. In other words, joint assembly 312 comprises components 314. For example, components 314 include first structure 304 and second structure 306. Components 314 in joint assembly 312 also may include fasteners 316.

In this illustrative example, end 318 of first structure 304 is connected to end 320 of second structure 306 at location 308. Fasteners 316 and other parts may be used to connect end 318 of first structure 304 to end 320 of second structure 306.

Further, first structure 304 may have a first side and a second side that is opposite the first side. The first side of first structure 304 may be connected to a third structure. For example, first structure 304 may be a composite stringer and second structure 306 may be a fitting. In this example, the third structure may then be a skin panel. The first side of first structure 304 may be connected to the third structure by fasteners 316.

In these illustrative examples, components 314 in joint assembly 312 also include cover 322. In these illustrative examples, cover 322 provides seal 332 for joint 310. Cover 322 is connected to first structure 304 and second structure 306 by fasteners 316. In some cases, cover 322 may be connected to first structure 304 and second structure 306 by fasteners 316 and/or an adhesive. In particular, cover 322 has first section 324, second section 326, and middle section 328. First section 324 is configured to be attached to first structure 304. Second section 326 is configured to be attached to second structure 306.

Middle section 328 is located between first section 324 and second section 326. In these illustrative examples, middle section 328 has length 330. Length 330 is configured to change in response to a movement between first structure 304 and second structure 306. In particular, in these examples, length 330 of middle section 328 is configured to change more at the second side of first structure 304 than the first side of first structure 304.

In these illustrative examples, first section 324, second section 326, and middle section 328 are part of a single component. Additionally, these sections may all be comprised of the same type of material. In these illustrative examples, cover 322 may be comprised of a material selected from one of a metal, titanium, aluminum, plastic, composite material, and/or other suitable types of materials.

Middle section 328 has shape 329 in the depicted examples. Shape 329 is configured to provide middle section 328 an ability to change length 330 in response to movement between first structure 304 and second structure 306. This shape may have various forms that provide middle section 328 the capability to deform such that length 330 changes. Shape 329 may take various forms, such as ridges, pleats, and/or other suitable types of shapes.

Seal 332 provided by cover 322 may be useful when first structure 304 has channel 334. Channel 334 may extend through first structure 304 to second structure 306. In some cases, second structure 306 also may have channel 336. Channel 334 and channel 336 may be in communication with each other.

In these illustrative examples, channel 334 and channel 336 may be configured to carry fluid 338. In other words, fluid 338 may flow through channel 334 and/or channel 336. Fluid 338 may take various forms, such as a liquid, a gas, or a combination of the two. Cover 322 is configured to reduce leakage 340 such that cover 322 may substantially reduce and/or prevent leakage 340 of fluid 338 at joint 310.

In particular, cover 322 provides seal 332 in a manner such that leakage 340 of fluid 338 from channel 334, channel 336, or a combination of the two is substantially prevented. Leakage 340 may be substantially prevented such that any leakage 340 of fluid 338 is minimal and inconsequential. For example, without limitation, any leakage 340 of fluid 338 does not cause any undesirable effect on other structures and/or on the operation of platform 302.

In the different illustrative examples, cover 322 is not configured to carry load 343 on joint 310. Other components in components 314 carry load 343 in these illustrative examples.

The illustration of joint environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a bridge, a power plant, a dam, a manufacturing facility, a building, and/or some other suitable object.

As another example, other joints may be present in platform 302 in addition to joint 310 connecting other structures to each other. Further, in some illustrative examples, channel 334 in first structure 304 may not carry fluid 338. Instead, cables, wiring bundles, and other structures may be located within channel 334.

Figure 4:
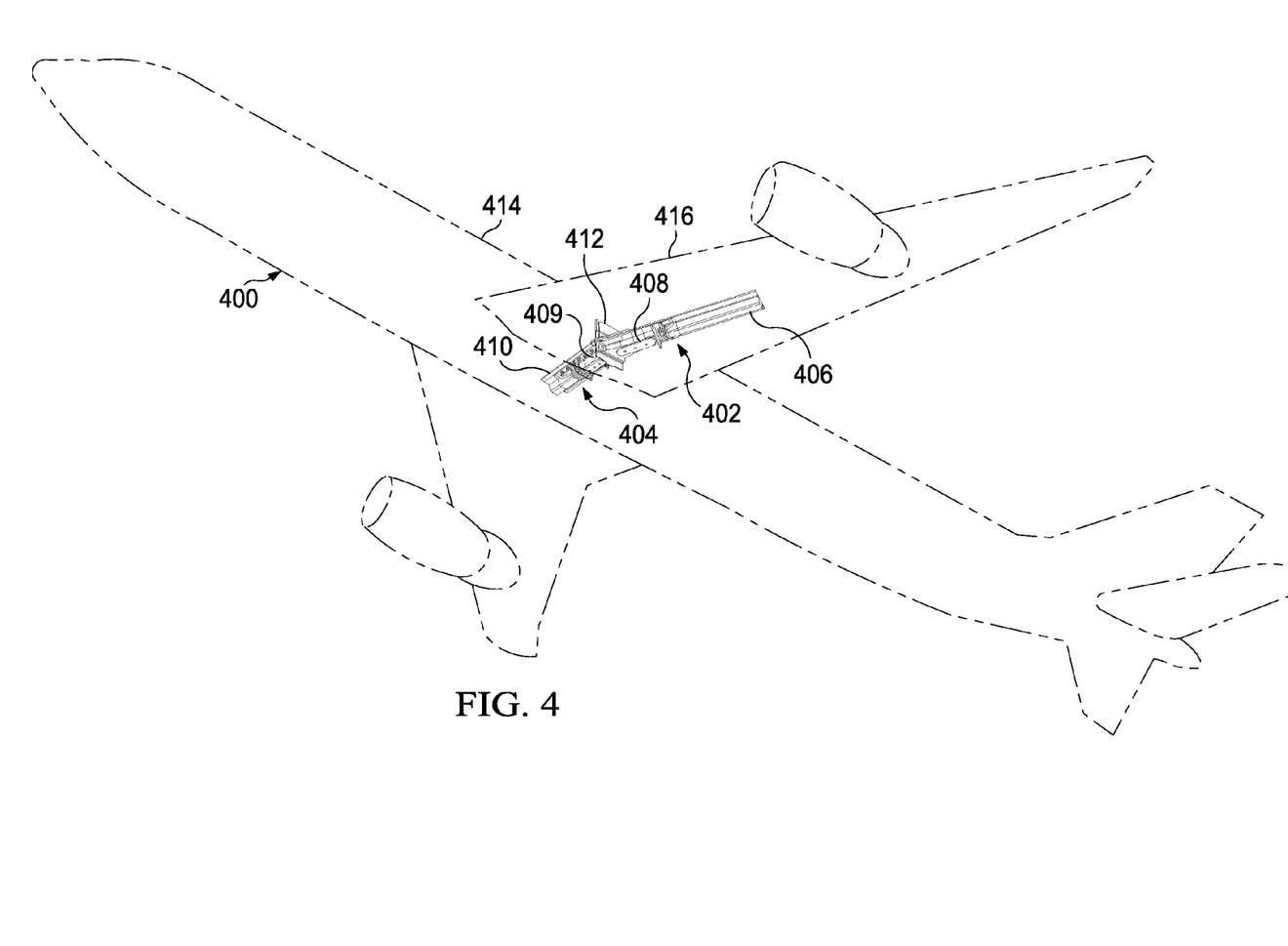
FIG. 4 is an illustration of an aircraft in which joint assemblies are present in accordance with an advantageous embodiment.

With reference now to FIG. 4, an illustration of an aircraft in which joint assemblies are present in accordance with an advantageous embodiment. In this illustrative example, aircraft 400 has joint 402 and joint 404. Joint 402 and joint 404 may be implemented using joint assemblies, such as joint assembly 312 in FIG. 3.

In other words, the different components used to form joint 402 and joint 404 in FIG. 4 and subsequent FIGS. 5-10 may be components in FIG. 3, comprised of components in FIG. 3, combined with components in FIG. 3, and/or used with components in FIG. 3. Additionally, at least some of the components depicted in FIGS. 4-10 are illustrative examples of how components shown in block form in FIG. 3 can be implemented as physical structures.

In FIG. 4, joint 402 is located at the connection between stringer 406 and fitting 408. In this example, stringer 406 is a composite stringer. Joint 404 is located at the connection between fitting 409 and stringer 410. In these illustrative examples, joint 404 forms a connector that is part of the airframe of aircraft 400. Fitting 408 and fitting 409 are located around wall 412 of fuselage 414. Stringer 406 extends through wing 416 to wall 412 of fuselage 414. Stringer 410 extends from wall 412 across fuselage 414 in these examples.

In these illustrative examples, stringer 406, fitting 408, fitting 409, and stringer 410 all have channels (not shown) extending through them. These channels may be in communication with each other to provide for a flow of fluid through those channels. For example, stringer 406 may be configured to carry fuel in the channel for stringer 406.

Figure 5:
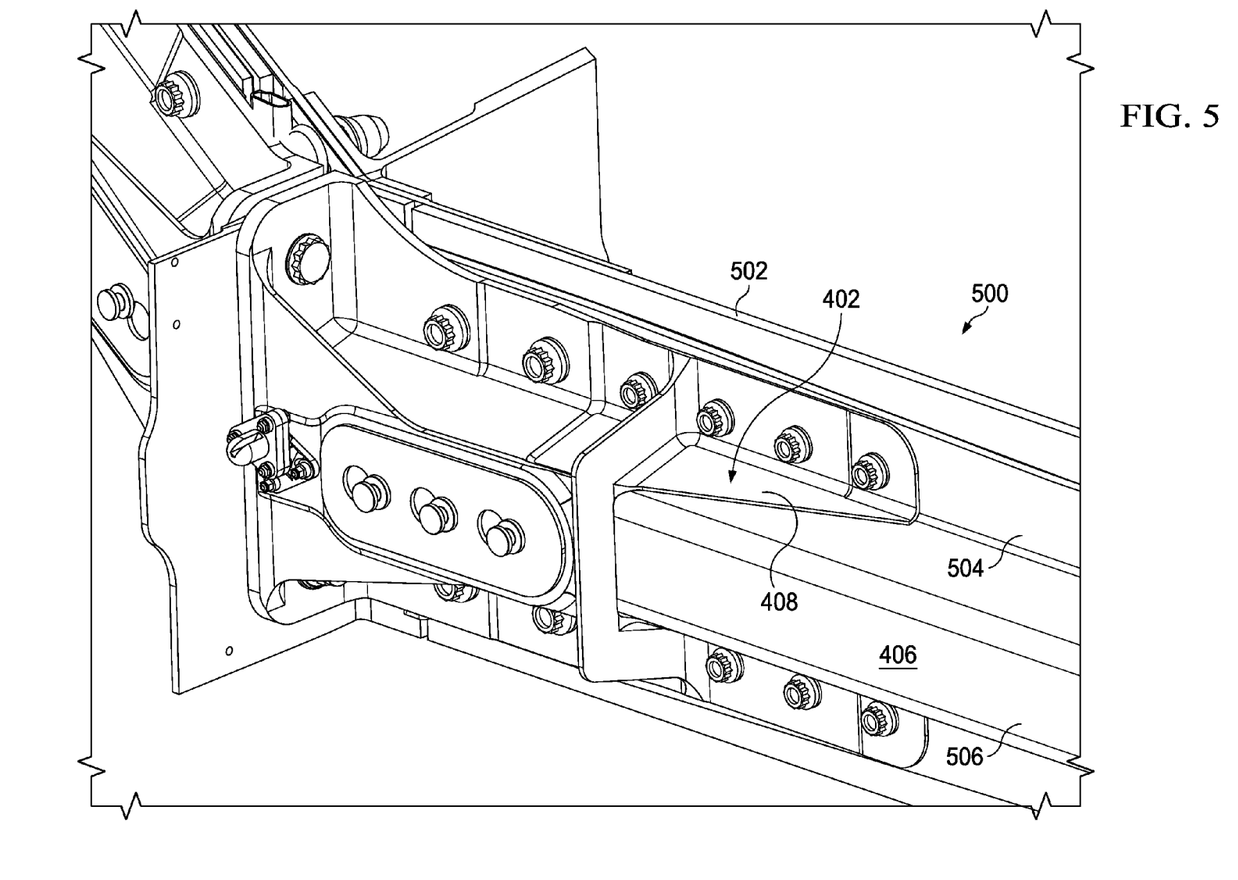
FIG. 5 is an illustration of a perspective view of a joint assembly without a cover in accordance with an advantageous embodiment.

With reference now to FIG. 5, an illustration of a perspective view of a joint assembly without a cover is depicted in accordance with an advantageous embodiment. In this illustrative example, joint assembly 500 is an example of one implementation for joint assembly 312 in FIG. 3. As depicted, joint assembly 500 is used to form joint 402. Joint assembly 500 includes fitting 408 and stringer 406.

Further, as illustrated in this example, stringer 406 has first side 504 and second side 506 opposite to first side 504. First side 504 is connected to skin panel 502. Second side 506 may be referred to as a cap for stringer 406.

Figure 6:
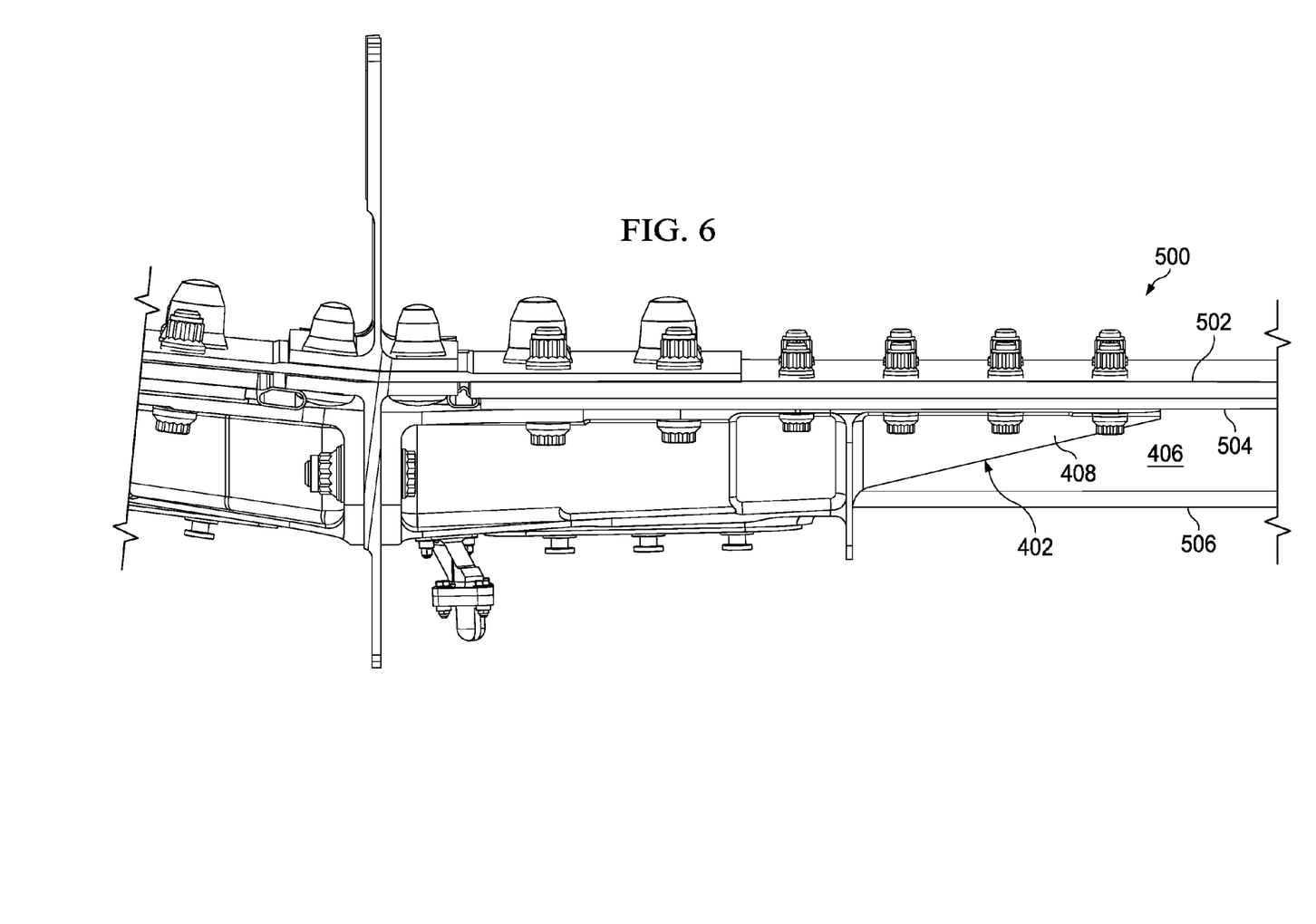
FIG. 6 is an illustration of a side view of a joint assembly without a cover in accordance with an advantageous embodiment.

Turning now to FIG. 6, an illustration of a side view of a joint assembly without a cover is depicted in accordance with an advantageous embodiment. In this illustrative example, a side view of joint assembly 500 is depicted.

Figure 7:
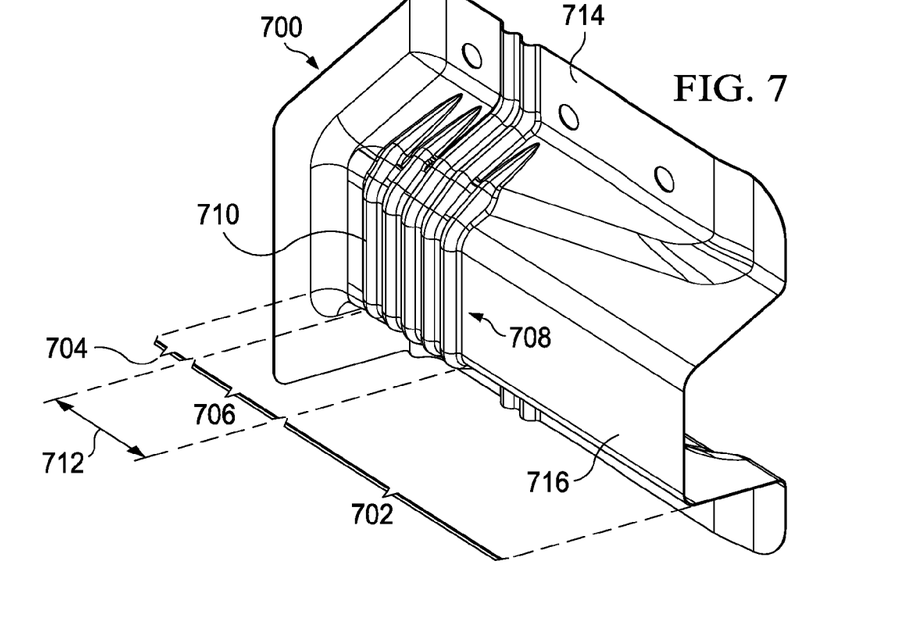
FIG. 7 is an illustration of a bottom perspective view of a cover for a joint assembly in accordance with an advantageous embodiment.

With reference now to FIG. 7, an illustration of a bottom perspective view of a cover for a joint assembly is depicted in accordance with an advantageous embodiment. In this illustrative example, cover 700 may be used in joint assembly 500 to provide a seal for joint 402 in FIG. 5. Cover 700 is an example of one implementation for cover 322 in FIG. 3. Cover 700 may be connected to fitting 408 and stringer 406 in FIG. 5. Further, cover 700 also may be connected to skin panel 502.

As depicted, cover 700 includes first section 702, second section 704, and middle section 706. First section 702 is configured to be connected to stringer 406 in FIG. 5. Second section 704 is configured to be connected to fitting 408 in FIG. 5.

Middle section 706 has shape 708. In this example, shape 708 for middle section 706 includes bellows 710. Bellows 710 allow length 712 of middle section 706 to change in response to movement between fitting 408 and stringer 406 when cover 700 is connected to fitting 408 and stringer 406 from FIG. 5.

In one embodiment, cover 700 may be a flexible sealing shroud. In this embodiment, bellows 710 in middle section 706 may include a beaded bellows region which allows cover 700 to flex when subjected to structural deflection relative to motion between stringer 406 and fitting 408 in FIG. 4. In other words, relative motion between stringer 406 and fitting 408 in FIG. 4 is absorbed in middle section 706.

Further, cover 700 has side 714 and side 716. Side 714 is connected to second side 506 of stringer 406 as shown in FIG. 5, while side 716 is connected to first side 504 of stringer 406, which is connected to skin panel 502 as shown in FIG. 5.

Length 712 of middle section 706 may change more at side 714 of cover 700 than at side 716 of cover 700.

In this illustrative example, a cross-section of bellows 710 may have a shape in the form of a sinusoidal wave, a sawtooth wave, some suitable type of periodic wave, or some other suitable non-planar shape.

Figure 8:
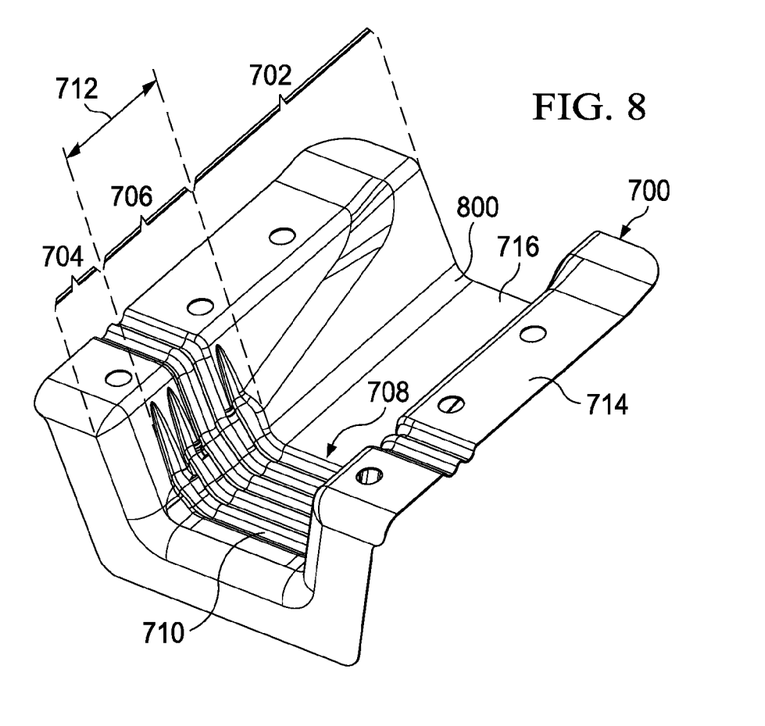
FIG. 8 is an illustration of a top perspective view of a cover for a joint assembly in accordance with an advantageous embodiment.

Turning now to FIG. 8, an illustration of a top perspective view of a cover for a joint assembly is depicted in accordance with an advantageous embodiment. In this illustrative example, cover 700 has channel 800 inside cover 700. Channel 800 has a shape that is configured to cover joint 402 in FIG. 5. In particular, portions of channel 800 may be configured to substantially conform to the shape of fitting 408 and stringer 406 at joint 404 in FIG. 5.

Figure 9:
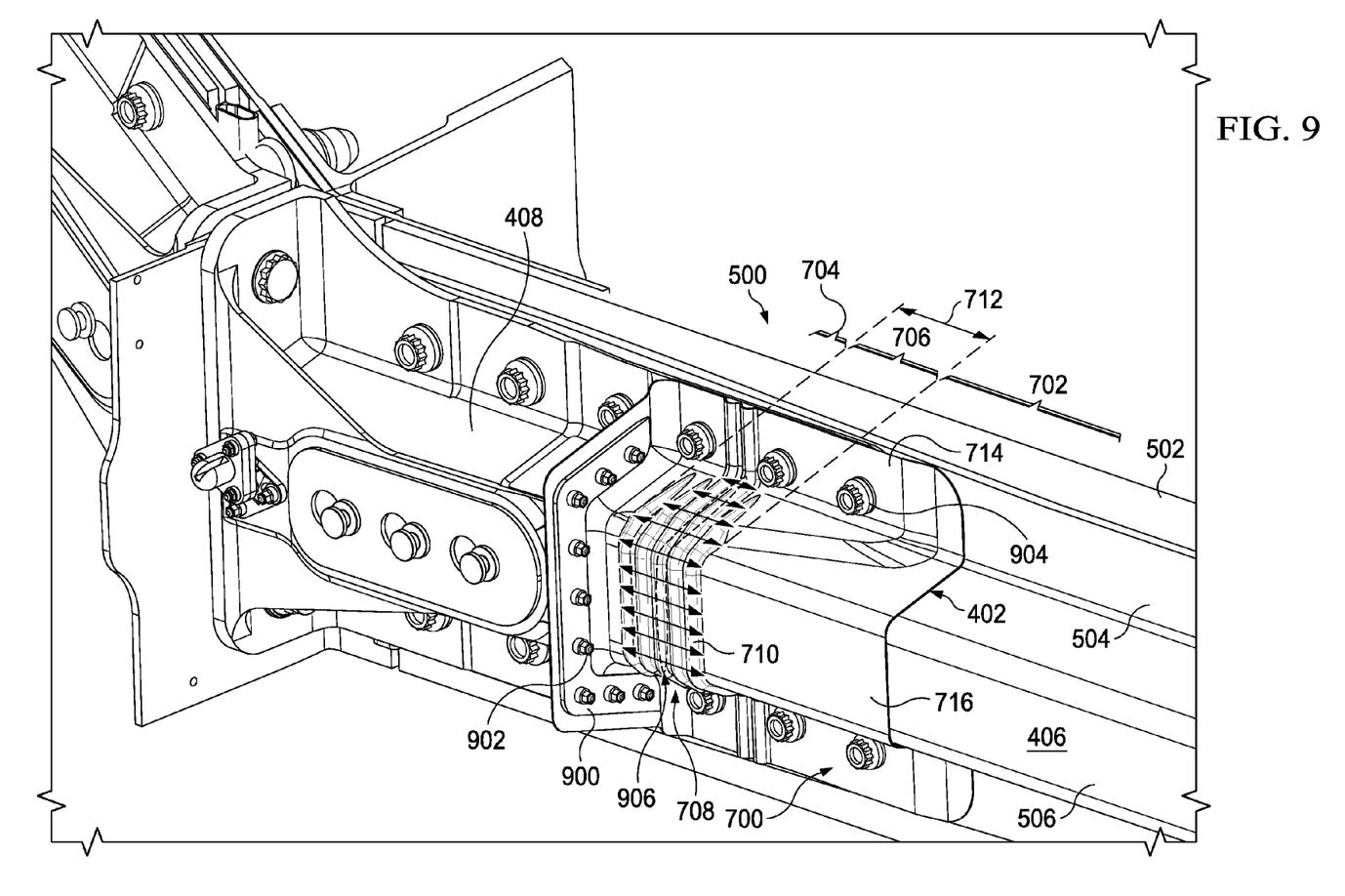
FIG. 9 is an illustration of a perspective view of an assembled joint assembly in accordance with an advantageous embodiment.

With reference now to FIG. 9, an illustration of a perspective view of an assembled joint assembly is depicted in accordance with an advantageous embodiment. In this illustrative example, joint assembly 500 is assembled with cover 700. Cover 700 is connected to fitting 408 and stringer 406.

In particular, first section 702 of cover 700 is connected to stringer 406. First section 702 is connected to stringer 406 using fasteners 904, in this illustrative example. First section 702 is configured to move with stringer 406 when length 712 of middle section 706 changes in response to relative motion between fitting 408 and stringer 406.

Second section 704 of cover 700 is connected to fitting 408 using members 900 and fasteners 902. Second section 704 is configured to move with fitting 408 when length 712 of middle section 706 changes in response to relative motion between fitting 408 and stringer 406.

In the embodiment in which bellows 710 are configured to flex in response to structural deflections relative to motion between fitting 408 and stringer 406, these structural deflections are smallest at side 714 of cover 700 connected to stringer 406 by fasteners 804 and greatest at side 716 of cover 700 covering the cap of stringer 406.

These deflections cause length 712 of middle section 706 to change. The relative changes in length 712 that may occur are indicated by arrows 906. As depicted, changes in length 712 may be greater at side 716 of cover 700, as indicated by the longer arrows of arrows 906, as compared to side 714 of cover 700, as indicated by the shorter arrows of arrows 906.

Figure 10:
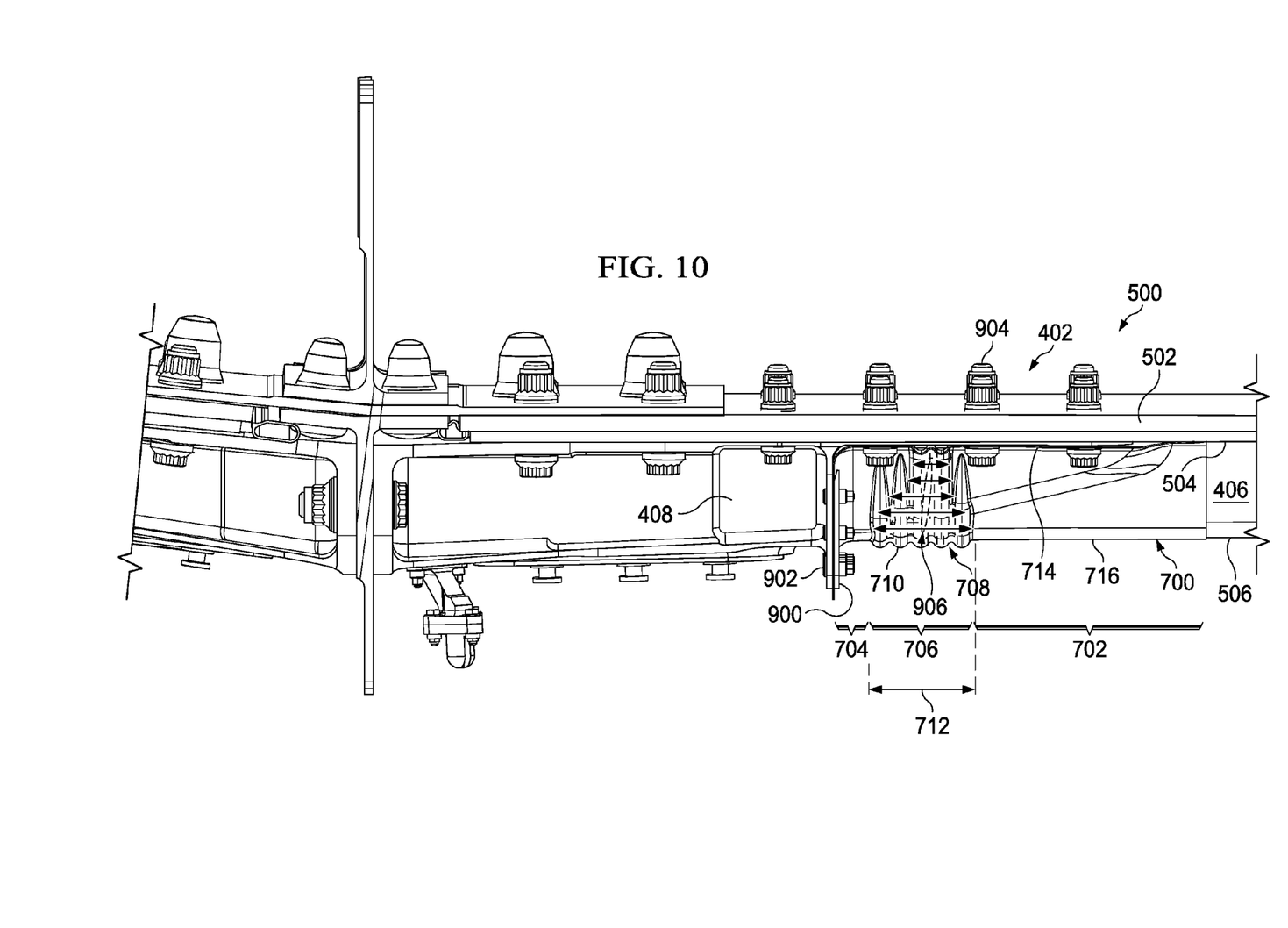
FIG. 10 is an illustration of a side view of an assembled joint assembly in accordance with an advantageous embodiment.

Turning now to FIG. 10, an illustration of a side view of an assembled joint assembly is depicted in accordance with an advantageous embodiment. In this illustrative example, joint assembly 500 is assembled with cover 700 providing a seal for joint 402.

Figure 11:
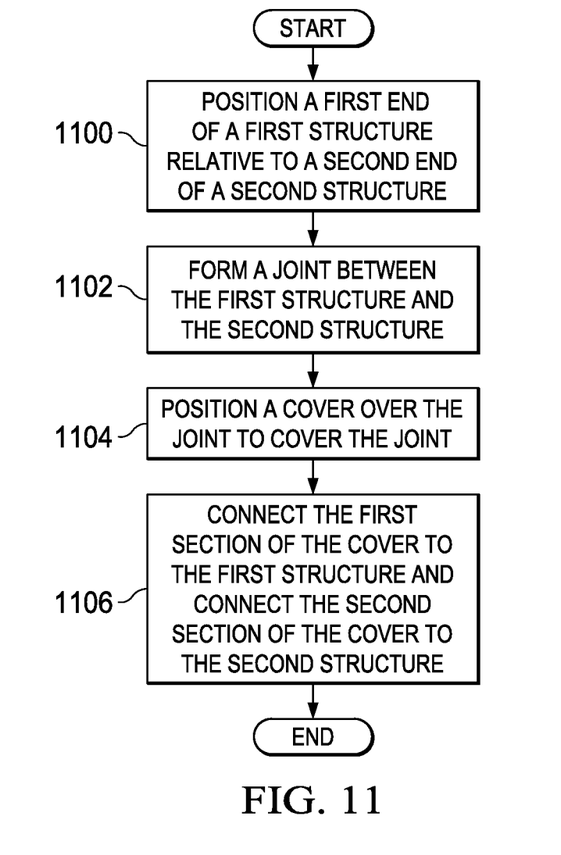
FIG. 11 is an illustration of a flowchart of a process for assembling a joint assembly in accordance with an advantageous embodiment.

With reference now to FIG. 11, an illustration of a flowchart of a process for assembling a joint assembly is depicted in accordance with an advantageous embodiment. The process illustrated in FIG. 11 may be implemented using joint assembly 312 in FIG. 3.

A first end of a first structure is positioned relative to a second end of a second structure (operation 1100). The first structure may be, for example, a fitting. The second structure may be, for example, a stringer. A joint is formed between the first structure and the second structure (operation 1102). The joint may be formed by fastening the first structure to the second structure using a plurality of fasteners and/or an adhesive.

Thereafter, a cover is positioned over the joint to cover the joint (operation 1104). The cover has a first section, a second section, and a middle section located between the first section and the second section. The first section of the cover is connected to the first structure and the second section of the cover is connected to the second structure (operation 1106), with the process terminating thereafter.

Operation 1106 may be performed by fastening the cover to at least one of the first structure, the second structure, and/or a third structure to cover the joint. A plurality of fasteners, adhesive, gap sealant, and/or other suitable items may be used for connecting the cover to the first structure and the second structure.

The first section is configured to move with the first structure. The second section is configured to move with the second structure. The middle section has a length that is configured to change in response to a movement between the first structure and the second structure.

The flowcharts and block diagrams in the different depicted embodiments illustrate the architecture, functionality, and operation of some possible implementations of apparatuses and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a cover for use in a joint assembly. The cover has a first section, a second section, and a middle section. The middle section is located between the first section and the second section. The first section is configured to be attached to a first structure, and the second section is configured to be attached to a second structure. The first structure and the second structure are connected at a joint. The middle section is located between the first section and the second section. The middle section has a length that is configured to change in response to a movement between the first structure and the second structure. The first section, the middle section, and the second section form a cover that is configured to form a seal for the joint. In one or more of the different illustrative examples, the first section, the second section, and the middle section are formed as a single piece from the same material.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. An aircraft joint assembly comprising:
   a composite stringer in an aircraft having a channel configured to carry a fluid;
   a fitting in the aircraft, wherein the composite stringer and the fitting are connected to each other at a joint; and
   a cover comprising:
   a first section connected to the composite stringer;
   a second section configured to be connected to the fitting; and
   a middle section located between the first section and the second section and having a length that is configured to change in response to a movement between the composite stringer and the fitting, wherein the first section, the middle section, and the second section form a cover that is configured to form a seal for the joint.

2. The aircraft joint assembly of claim 1, wherein the cover is configured to substantially prevent fluid from leaking out of the channel at the joint.

3. The aircraft joint assembly of claim 2, wherein the channel is configured to carry the fluid.

4. The aircraft joint assembly of claim 2, wherein the channel includes a first channel, and wherein the fitting has a second channel and the first channel and the second channel are in communication with each other at the joint.

5. The aircraft joint assembly of claim 1, wherein the middle section is connected to at least one of the composite stringer, the fitting, and a third structure.

6. The aircraft joint assembly of claim 1, wherein the first section is connected to the composite stringer and the second section is connected to the fitting by at least one of a plurality of fasteners and an adhesive.

7. The aircraft joint assembly of claim 6, wherein the composite stringer comprises a first side, and a second side opposite of the first side, the plurality of fasteners attach the first side to a third structure, and the length of the middle section of the cover changes more at the second side than the first side.

8. The aircraft joint assembly of claim 1, wherein the cover is comprised of a material selected from one of a metal, titanium, aluminum, plastic, and a composite material.

9. The aircraft joint assembly of claim 1, wherein the composite stringer is connected to a number of skin panels.

10. The aircraft joint assembly of claim 9, wherein the composite stringer is configured to carry fuel in the channel.

* * * * *